UNITED STATES PATENT OFFICE.

JOHN E. LAUER, OF NEW YORK, N. Y.

PREPARING GLUTEN FLOUR AND BREAD.

SPECIFICATION forming part of Letters Patent No. 334,245, dated January 12, 1886.

Application filed April 1, 1885. Serial No. 160,953. (No specimens.)

*To all whom it may concern:*

Be it known that I, JOHN E. LAUER, of the city and county of New York, in the State of New York, have invented a new and useful Improvement in the Art of Making Gluten Bread and Flour, of which the following is a specification.

The object of my invention is to provide gluten bread and flour for making other articles of food which will be very nutritious and palatable, and will therefore be very desirable for invalids and children, and especially for persons suffering from diabetic disorders. In this connection I am aware of the manufacture and sale of what is known as "gluten bread," but which is really nothing more than improved "Graham" bread, containing all the elements of the wheat, and including about forty (40) per centum of starch. I am also aware of the importation and sale of what is known as "gluten bread," but which has none of the ordinary characteristics of bread, and is dry, friable, dark in color, absolutely tasteless, and does not soften under mastication. This so-called "bread" is seemingly a compound of the waste gluten obtained from starch manufacture with wheat-bran.

In carrying out my invention I employ flour from any kind of wheat, but prefer flour made from spring-wheat, as it contains a larger proportion of gluten. I mix this flour into a stiff paste or dough with water, or under running water, until a large part of the starch is removed. I intend that after so kneading and working the flour only about ten or twelve per centum of starch shall remain. I then take a portion of the soft dough, dry it at a temperature not exceeding 150° Fahrenheit, and then grind it into a fine powder. When it is desired to make bread at once, I mix with the soft gluten dough or mass a sufficient quantity of the gluten powder to bring it to the consistency required, and then add a proper amount of yeast or agent of fermentation, and fermentation is allowed to take place rapidly at a temperature of about 90° Fahrenheit, so that from eight to ten per centum of the remaining starch will be destroyed by its conversion into carbonic acid and alcohol. The mass so fermented is baked in the usual way.

By this process I obtain a light, porous, palatable bread that on an average will not contain more than about three per centum of starch.

Experiments have shown that if the removal of starch by washing it out is carried on until no more than two or three per centum of starch remains, a very tough and tasteless bread is obtained, not fit to be eaten. Where a portion of the starch is removed by fermentation, as above described, the bread will not only be nutritious, but will be very palatable. The bread will remain moist and soft for many days, so that it can be sent to no inconsiderable distance. I may, however, cut it into slices, thoroughly dry them and pack properly for shipment, so that it may be sold in the market. With proper directions furnished, such dried gluten bread can readily be made into a palatable substitute for fresh bread or can be further treated by a skillful cook, so as to produce a variety of tasteful dishes. I may also take the mass of moist gluten first obtained, ferment the same, as above described, to reduce the quantity of starch to about two or three per centum, then dry the mass and grind it into a fine flour, to be used in preparing various dishes, such as porridge, puddings, griddle-cakes, &c.

I am aware that it has been proposed to make bread or cakes by removing nearly all the starch from rasped potatoes and then mixing with the remaining matter mutton-suet, eggs, butter, carbonate of soda, and dilute hydrochloric acid and baking the same.

I am also aware that it is not new to take gluten resulting from extracting the starch from wheat-flour by the mechanical process and add to it wheat-flour to obtain a mixture containing about forty-two per centum of gluten, and to then employ this in the making of bread, cakes, &c.

I am also aware of British Letters Patent No. 2,004 of 1853, which describes the use of gluten in the making of bread, and particularly states that in preparing gluten bread of whatever flour no use should be made of leaven.

I am also aware of British Letters Patent No. 895 of 1852, which describes the preparation and use of gluten by first washing a paste of wheat-flour to obtain a gluten paste, then mixing it with flour and drying and powdering it, and repeating the operation with fresh gluten, always adding a portion of the gluten powder obtained from the previous operation. It is therein stated that the final gluten powder obtained by these repeated operations is well adapted for improving flour poor in gluten for making bread, pastry, &c.

I do not desire to include in my invention any of the methods above referred to as old.

The unpalatable qualities of pure gluten bread have long been recognized, and hence gluten has usually been mixed with wheat-flour or other starchy products before being made into bread or otherwise prepared for food. I do not mix gluten with wheat-flour. By my method I first wash out or remove mechanically nearly all the starch, leaving only about twelve or thirteen per centum. I then add ferment and remove or convert all the remaining starch, except about two or three per centum. By this method I obtain a bread which is nutritious and palatable, and only contains about three per centum of starch, such a bread being particularly desirable for persons suffering from diabetic disorders.

What I claim as my invention, and desire to secure by Letters Patent, is—

1. The improvement in the art of preparing wheaten bread and flour, consisting in mechanically removing or washing out a large portion of the starch from wheat-flour and in removing or converting nearly all the remaining starch by fermentation, substantially as herein described.

2. The improvement in the art of preparing gluten flour, consisting in mechanically removing or washing out a large portion of the starch from wheat-flour, in then removing or converting nearly all the remaining starch by fermentation, and in then drying and grinding the fermented mass, substantially as herein described.

JOHN E. LAUER.

Witnesses:
FREDK. HAYNES,
MATTHEW POLLOCK.